Sept. 26, 1961 A. KOBLIN 3,001,402
VAPOR AND AEROSOL SAMPLER
Filed Aug. 6, 1959
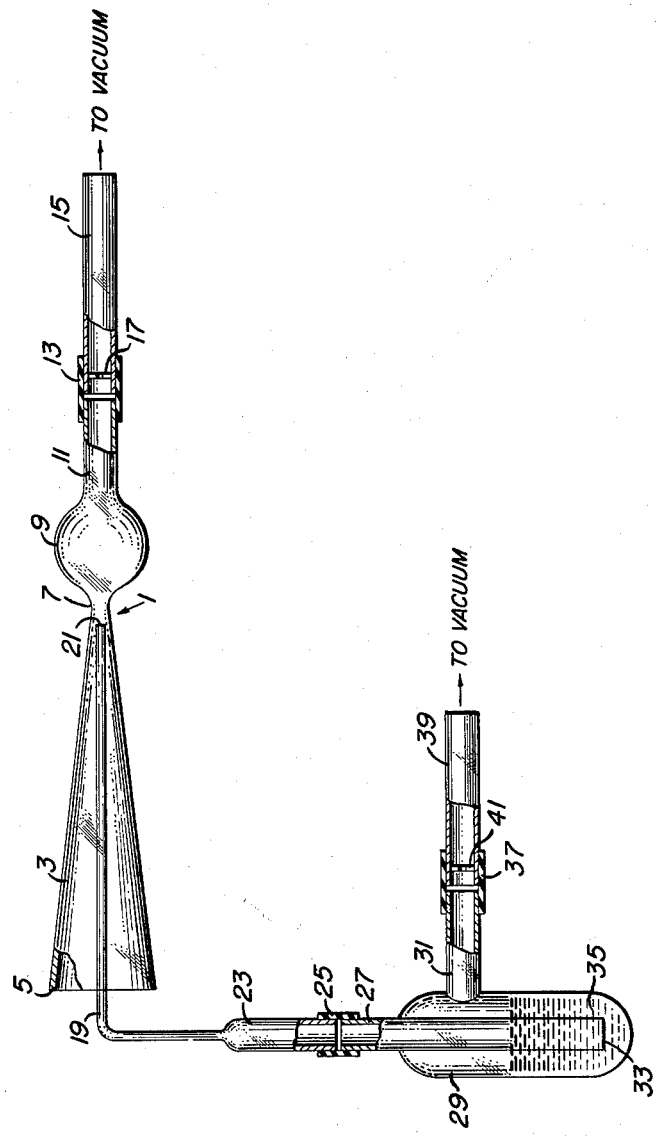
INVENTOR
*Abraham Koblin*
BY *George Renehan*
ATTORNEY

United States Patent Office 3,001,402
Patented Sept. 26, 1961

3,001,402
VAPOR AND AEROSOL SAMPLER
Abraham Koblin, Baltimore, Md., assignor to the United States of America as represented by the Secretary of the Army
Filed Aug. 6, 1959, Ser. No. 832,126
3 Claims. (Cl. 73—421.5)
(Granted under Title 35, U.S. Code (1952), sec. 266)

The invention described herein may be manufactured and used by or for the Government of the United States of America for governmental purposes without the payment to me of any royalty thereon.

This invention relates to a sampler for use in determining the amount of vapor that is present in an aerosol cloud produced from liquid compounds, primarily organic in nature. It serves to separate the vapors that may be present from the aerosal particles. When organic liquids are dispersed in fine droplets form, there is also present a certain concentration of vapor or gas. This is due to the evaporation of the very small droplets. This apparatus permits the determination of the amount of the compound that is present in the vapor form and the amount that is present as droplets. By suitable adjustment it may also be used to sample the droplets according to size.

The drawing is a side view of the apparatus constituting my invention, with parts shown in section.

Referring to the drawing, the apparatus includes an intake unit indicated generally at 1. The intake unit includes an intake sample cone 3 which tapers from an enlarged inlet end 5 to a restricted throat 7. Beyond the throat 7 the unit is again enlarged to form an expansion chamber 9 which communicates with an outlet tube 11. The outlet tube is connected by a sleeve 13 to a first suction tube 15 containing an orifice plate 17 which contains a calibrated orifice. Suction tube 15 is connected to a suction means, not shown. A sample probe 19, which is a small diameter tube, is coaxial with the intake cone 3. It has an open end 21 which is adjacent the throat 7. It will be noted that the probe 19 has a diameter less than that of throat 7 and that the open end 21 faces in the direction of the convergence of cone 3.

The probe 19 is integral with an enlarged tube 23 which is connected by a sleeve 25 to intake tube 27 of an absorber 29. The absorber 29 is provided with an outlet tube 31. The lower end 33 of inlet tube 27 is located substantially below the outlet tube 31 and beneath the surface of a body of absorbent liquid 35. Outlet tube 31 is connected by a sleeve 37 to a second suction tube 39 containing a second orifice plate 41. Suction tube 39 is connected to a source of suction, not shown, which may be either the same as or different from that to which the first employed suction tube 15 is connected.

In use, the apparatus is employed to sample air or other gas. The main stream of air is drawn in through intake cone 3, throat 7, expansion chamber 9 and orifice 17. By proper correlation of the suction pressure and the size of the orifice in plate 17 a known rate of flow is secured. At the same time, a much smaller secondary flow of air is drawn from this main stream through open end 21, probe 19, absorber 29 and orifice plate 41. This flow is likewise maintained at a known value by selection of the suction pressure and the size of the orifice in plate 41. For example 70 liters per minute may be drawn through orifice plate 17 and 1 liter per minute may be drawn through orifice plate 41.

Returning now to intake cone 3, the air stream increases in velocity as the diameter of the cone decreases so that it attains a high velocity adjacent throat 7. This imparts considerable momentum to the entrained droplets. The withdrawal of the secondary air stream into the open end 21 gives a sudden reversal in direction to this portion of the stream. The droplets, due to their momentum, do not reverse their direction but continue on in the main stream. The vapor, being present in its molecular state, does not have momentum substantially different from the air or other gas and therefore enters the opening 21. The vapor is absorbed in the liquid 35, which is suitably chosen to accomplish this purpose. Since the flow through orifice 41 is known, the amount of vapor present in a given volume of the air can be determined by suitable analysis of the liquid 35. If desired, the combined amount of aerosol and vapor may be determined in the air flowing from tube 15.

The expansion chamber 9 aids in stabilizing the flow adjacent opening 21. It prevents aerosol particles from being carried back and into probe 19 as a result of turbulence.

In some cases it may be desired to separate the droplets according to size and determine the smaller droplets along with the vapor. This may be accomplished either by suitable adjustment of the rate of flow through the unit 1 or by adjusting the relative positions of unit 1 and probe 19 so that the opening 21 is positioned nearer to inlet 5. In either case the arrangement is so chosen that the velocity of flow adjacent opening 21 is such that the momentum of the smaller particles, as well as the vapors, is sufficiently small to permit them to enter probe 9 while the larger particles continue on in the main air screen.

While I have shown a bubbler type absorber at 29 it will of course be understood that other types of collection means for the vapors may be employed. For example, a canister filled with activated charcoal or other adsorbent may be substituted. Various forms of absorbers or adsorbers may be used in connection with tube 15 or may be omitted at this point, depending on the particular type of determination to be made.

While I have described one embodiment of my device in detail it is obvious that various changes can be made. I therefore intend that my invention be limited solely by the appended claims.

I claim:

1. A separator for aerosol particles comprising an intake cone converging from an enlarged open inlet end to a restricted throat, means for drawing a main air stream at a constant rate through said intake cone from said inlet end, a probe within and substantially coaxial with said inlet cone and having an open end adjacent said throat and facing in the direction of convergence of said cone, said probe having a diameter substantially less than that of said throat, and means for drawing a secondary air stream at a constant rate from said main air stream through said open end into said probe.

2. A separator as defined in claim 1 having in combination therewith means to recover vapors from said secondary air stream.

3. A vapor and aerosol sampler comprising an intake cone having an open intake end and converging from said intake end to a restricted throat, an enlarged expansion chamber adjacent to and in communication with said restricted throat, an outlet tube joined to said expansion chamber, means for drawing a main air stream at a constant rate from said inlet end through said cone, expansion chamber and outlet tube, a thin tubular probe within and substantially coaxial with said cone and having an open end adjacent said throat and facing in the direction of convergence of said cone, said tubular probe having a diameter substantially smaller than that of said throat, a collecting means adapted to separate vapors from air connected to said tubular probe, and means for drawing a secondary stream of air from said main air stream through said open end and thence through said tubular probe and said collecting means at a substantially constant rate.

References Cited in the file of this patent

UNITED STATES PATENTS

| | | |
|---|---|---|
| 806,129 | Ford | Dec. 5, 1905 |
| 1,643,155 | Eisenschitz | Sept. 20, 1927 |
| 1,658,391 | Potter | Feb. 7, 1928 |
| 2,353,828 | Hyde | July 18, 1944 |
| 2,879,664 | Tait | Mar. 31, 1959 |